(12) United States Patent
Prade et al.

(10) Patent No.: US 11,117,524 B2
(45) Date of Patent: Sep. 14, 2021

(54) INFLATABLE TRANSPORT BOX

(71) Applicant: Ernstfried Prade, Kinsau (DE)

(72) Inventors: Ernstfried Prade, Kinsau (DE); Daniel Weinberger, Apfeldorf (DE)

(73) Assignee: Prade Ernstfried, Kinsau (DE)

( * ) Notice: Subject to any disclaimer, the term of this patent is extended or adjusted under 35 U.S.C. 154(b) by 203 days.

(21) Appl. No.: 16/474,365

(22) PCT Filed: Dec. 21, 2017

(86) PCT No.: PCT/EP2017/084254
§ 371 (c)(1),
(2) Date: Jun. 27, 2019

(87) PCT Pub. No.: WO2018/122127
PCT Pub. Date: Jul. 5, 2018

(65) Prior Publication Data
US 2019/0335703 A1    Nov. 7, 2019

(30) Foreign Application Priority Data

Dec. 30, 2016 (DE) .................... 10 2016 015 642.2

(51) Int. Cl.
*B60R 7/00* (2006.01)
*A01K 1/02* (2006.01)

(52) U.S. Cl.
CPC .............. *B60R 7/00* (2013.01); *A01K 1/0281* (2013.01)

(58) Field of Classification Search
CPC .. B60R 7/00; B60R 5/042; B60R 5/04; B60R 9/06; B60P 3/04; B60P 7/065; B60P 7/0892; B60P 7/16; A01K 1/0035; A01K 1/0236; A01K 1/0272; A45C 7/0081; A45C 13/021; B65D 81/052
USPC ........ 410/119, 121, 124, 125, 155; 119/453, 119/474, 498, 752
See application file for complete search history.

(56) References Cited

U.S. PATENT DOCUMENTS

| | | | |
|---|---|---|---|
| 7,478,858 B1 * | 1/2009 | Brun ......................... | B60R 5/04 296/24.31 |
| 8,167,520 B2 * | 5/2012 | Stephens ................... | B60R 7/00 410/119 |
| 2006/0239791 A1 * | 10/2006 | Morris ..................... | B60J 7/104 410/119 |

(Continued)

FOREIGN PATENT DOCUMENTS

| DE | 102004056026 A1 | 6/2006 |
|---|---|---|
| WO | 2016145239 A1 | 9/2016 |

*Primary Examiner* — Stephen T Gordon
(74) *Attorney, Agent, or Firm* — David Guerra

(57) ABSTRACT

An inflatable transport box including a base, a rear wall, and first and second side walls. The rear wall can be connected to the base along a folding edge and forming a single-piece drop stitch component with the base. The first and second side walls can be connected to opposite sides of the rear wall along folding edges, respectively. The side walls can be drop stitch components. The base, the rear wall and the side walls can be made of drop stitch material including an outer drop stitch wall and an inner drop stitch wall. Partial surfaces of the inner drop stitch wall of the rear wall and the side walls, respectively, can be arranged on both sides of a fold, and can be configured to come to rest on top of each other to form adhesive surfaces that are adhesively bonded together or welded to each other.

18 Claims, 3 Drawing Sheets

(56) References Cited

U.S. PATENT DOCUMENTS

| | | | |
|---|---|---|---|
| 2011/0142563 A1* | 6/2011 | Maresh | B65D 90/0073 |
| | | | 410/121 |
| 2013/0000036 A1 | 1/2013 | Wood | |
| 2013/0220231 A1* | 8/2013 | Hovsepian | A01K 1/0272 |
| | | | 119/496 |

* cited by examiner

INFLATABLE TRANSPORT BOX

CROSS-REFERENCE TO RELATED APPLICATIONS

This application is an U.S. national phase application under 35 U.S.C. § 371 based upon co-pending International Application No. PCT/EP2017/084254 filed on Dec. 21, 2016. Additionally, this U.S. national phase application claims the benefit of priority of International Application No. PCT/EP2017/084254 filed on Dec. 21, 2016 and German (DE) Application No. 10 2016 015 642.2 filed on Dec. 30, 2016. The entire disclosures of the prior applications are incorporated herein by reference. The international application was published on Jul. 5, 2018 under Publication No. WO 2018/122127 A1.

BACKGROUND

Technical Field

The invention relates to an inflatable transport box, especially for the transport of dogs in a motorcar.

Background Description

Transport boxes are usually made of wood, metal and/or plastics. Transport boxes are used, for example, for the transport of dogs in motorcars. Wood panels are often arranged in the lower region, while the upper field of view of the dog is closed by bars. The major drawback of such transport boxes is their weight and their bulkiness. They are generally so heavy that they can only be carried by two persons. Another major disadvantage is their storage. Owing to their size, they can hardly be accommodated in a standard garage and/or require a lot of space.

It is the object of the invention to provide a simple, lightweight transport box that can be collapsed into a small size, as well as practical applications of the transport box.

The present invention proposes a transport box made of inflatable drop stitch material. The two side walls, the rear wall and the base of the transport box are made of one single drop stitch panel. The drop stitch material consists of an outer wall and an inner wall, between which threads are stretched, which, after inflation, keep both spaced apart, thus resulting in a parallel outer and inner wall. By folding the inner drop stitch wall, partial surfaces of the inner wall, arranged on both sides of the fold, come to rest on top of each other, being adhesively-bonded or welded together. This causes the inner wall to be shortened. The adhesively-bonded surfaces force the otherwise flat drop stitch panel, which is completely enclosed at the edge by a pressure-tight edge strip, into an angle-bounded shape. A valve is present for inflating. Advantageously, with this type of box construction from a drop stitch panel instead of a plurality of valves for the rear wall, the side walls and the base, one valve only is required for inflation. The adhesive bonding of the outer and inner walls of a drop stitch panel according to the invention results in significant time savings in the production because adhesive seams and valves are dispensed with.

Preferably, the transport box is inflated by an electrically driven pump.

The easy opening and closing of the transport box is attained by a roll-up front and top. The roll-up top is fastened to the side walls by zippers.

During the outflow of the air from the inflatable transport box the side walls are caused to fold by integrated folding properties along folding lines, so that orderly collapsing of the transport box is attained when the individual transport box surfaces are lowered. The transport box can therefore remain in the folded state lying flat on the floor, such as a trunk of a car. After the air has escaped, it is only a few centimetres high.

Such a transport box is very versatile. For example, it may be used as a transport box for animals, in particular dogs. It can also be used as a structure of a bicycle trailer for children, in which case it advantageously comprises on the inside a seat or a bench for children. The bench can likewise consist of drop stitch material.

Also, the transport box may be mounted on a pallet, in which case the pallet preferably comprises a rigid base, for example in the form of a trough on which the transport box is arranged. The transport box then forms the side walls of the transport pallet so generated, the trough or the rigid base of the pallet forming the base of the box or being an integral part of its base.

Conventional pallets have a rigid base on which the transport material is transported. Conventional pallets often have wheels as well on the underside and side walls which prevent the falling off of the transport material, as well as fork fixtures on the floor for a pallet truck or forklift.

BRIEF SUMMARY OF THE PRESENT TECHNOLOGY

The pallet according to the invention has a rigid base, which may be formed as a trough. The side walls of the pallet are formed by a transport box with drop stitch walls. The bottom of the pallet or the trough may be formed as the base of the transport box. The transport box may, however, have its own base, which is mounted on the rigid bottom of the pallet. It is advantageous to releasably fix the transport box to the pallet, so that the transport box represents an interchangeable box.

However, the transport box can of course also be used by itself.

In a bicycle trailer for children, the base of the trailer may be made of a rigid tray, with the side walls and the rear wall consisting of a twice folded drop stitch panel, which may advantageously comprise side windows in the side walls and rear windows in the rear wall. The top and front are closed by a roll-up tarpaulin which can be opened.

In the inflatable transport box viewing windows may be incorporated in the side walls, the rear wall and the front wall. These cut-outs in the drop stitch panel are advantageously reinforced with injection-moulded parts, thus forming windows. Horizontal rods are arranged in the windows serving as bars and at the same time as a handle for the transport box. The inside of the transport box can be coated with a washable materials, so that the surfaces are easy to clean with water. Advantages of the inflatable transport box according to the invention are light weight, easy handling and the ability to be folded into a small handy package.

It is also advantageous to design the sides as double walls. The inflated sides and the front wall, when used as a dog crate, also serve as impact protection, similar to an air bag, for dogs in the event of car accidents. In addition, the double walls and the base have excellent insulation properties.

According to one aspect of the present technology, the present technology essentially includes an inflatable transport box including a base, a rear wall, and first and second side walls. The rear wall can be connected to the base along a folding edge and forming a single-piece drop stitch component with the base. The first and second side walls can be connected to opposite sides of the rear wall along folding edges, respectively. The side walls can be drop stitch components. The base, the rear wall and the side walls can be made of drop stitch material including an outer drop stitch wall and an inner drop stitch wall. Partial surfaces of the inner drop stitch wall of the rear wall and the side walls, respectively, can be arranged on both sides of a fold, and can be configured to come to rest on top of each other to form adhesive surfaces that are adhesively bonded together or welded to each other.

According to another aspect of the present technology, the present technology essentially includes an inflatable transport box including a base, a rear wall, and first and second side walls. The rear wall can be connected to said base along a folding edge and forming a single-piece drop stitch component with the base. The first and second side walls can be connected to opposite sides of the rear wall along folding edges, respectively. The side walls can be drop stitch components. The base, the rear wall and the side walls can be made of drop stitch material including an outer drop stitch wall and an inner drop stitch wall. Partial surfaces of the inner drop stitch wall of the rear wall and the side walls, respectively, can be arranged on both sides of a fold, and can be configured to come to rest on top of each other to form adhesive surfaces that are adhesively bonded together or welded to each other. The folding edges can be configured to define a gap through which air flows, said gap being at an angle next to said adhesive surfaces, respectively.

In some embodiments, the adhesive surfaces are rectangular.

In some embodiments, the folding edges are configured to define a gap through which air flows. The gap can be at an angle next to the adhesive surfaces, respectively.

In some embodiments, each of said side walls can define a window.

Some embodiments of the present technology can further include at least one transverse rod arranged in the window of each of the side walls.

In some embodiments, the rear wall defines a rear wall window can include a transverse rod arranged in the rear wall window.

Some embodiments of the present technology can include a top wall configured to be rolled up. The top wall can be mounted to an upper edge of the rear wall.

In some embodiments, the top wall can be connectable to an upper edge of the side walls by a zipper, respectively. The zipper can be configured to allow the top wall to be opened or closed.

In some embodiments, the top wall can be configured to be connectable to a front edge of the side walls by the zipper, respectively. The top wall has a length configured to cover between the upper edges of the side walls and between the front edges of the side walls when the top wall is in a closed position.

In some embodiments, each of the side walls is configured to collapse.

In some embodiments, the side walls are respectively connected to the base along a folding edge and that the side walls are foldable along diagonal folding lines after air has been released.

In some embodiments, the diagonal folding lines can be configured to allow the side walls to inwardly fold toward the base, and the rear wall is configured to fold forward to rest on the folded side walls.

In some embodiments, each of the folding lines extend from a corner defined by where the base, the rear wall and the side walls meet, to a front edge of the side walls, respectively.

In some embodiments, each of the side walls defines a window located between an upper edge of the side walls and the folding lines, respectively.

In some embodiments, the transport box can be included with an article selected from the group consisting of an animal crate configured to accommodate one or more animals therein, a bicycle trailer configured to accommodate and transport of at least one child, and a pallet configured to receive a transport material.

There has thus been outlined, rather broadly, features of the present technology in order that the detailed description thereof that follows may be better understood and in order that the present contribution to the art may be better appreciated.

BRIEF DESCRIPTION OF THE DRAWINGS

Further details are set out in the description of an embodiment, reference being made to the accompanying drawings.

There are shown in.

DETAILED DESCRIPTION OF THE PRESENT TECHNOLOGY

Figure 1:
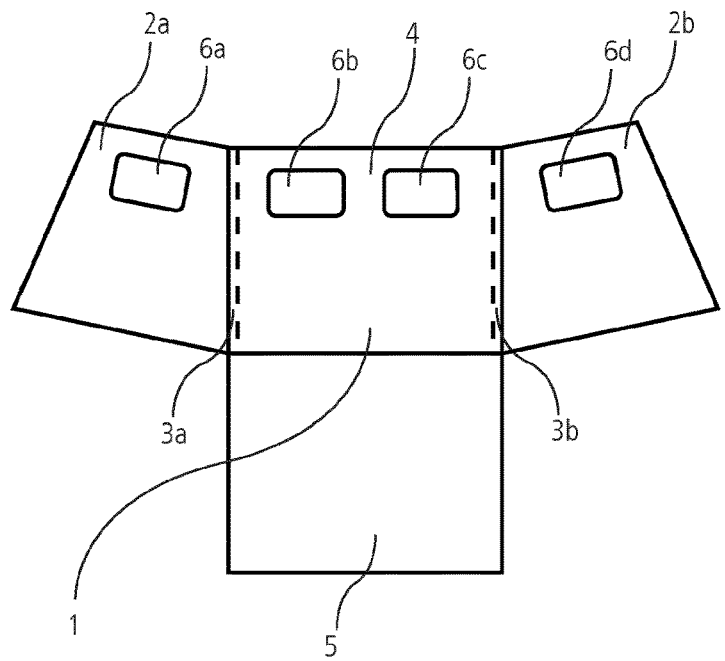
FIG. 1 is a top plane view of a flat-lying drop stitch panel (1) of the present technology.

Referring now to the drawings, and particularly to FIGS. 1-6, an embodiment of the inflatable transport box of the present technology is shown.

FIG. 1 shows a flat-lying drop stitch panel (1) with its side wall on the left (2a) and its side wall on the right (2b), its folding mark on the left (3a) and its folding mark on the right (3b), its rear wall (4), its base (5) and the windows (6a), (6b), (6c), (6d).

Figure 2:
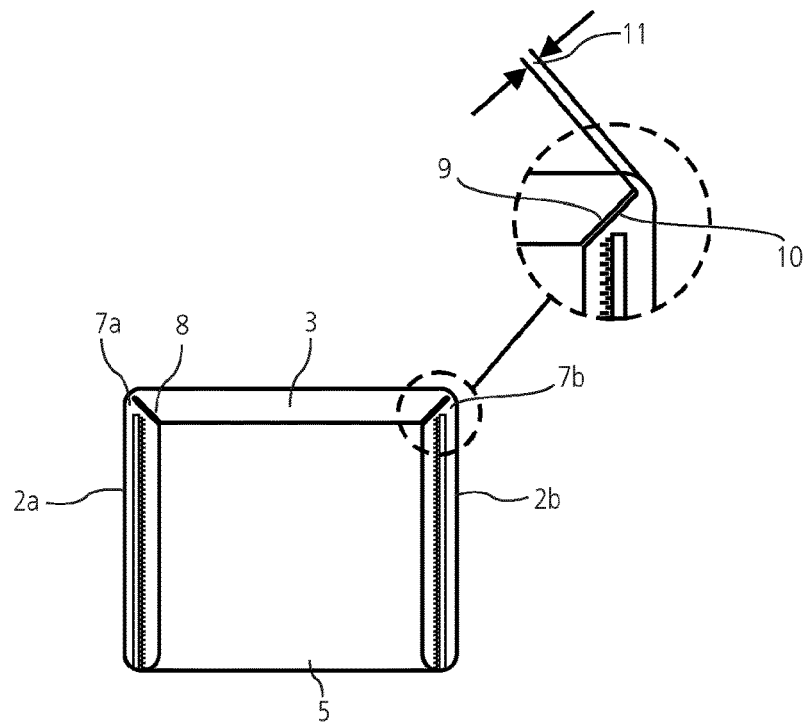
FIG. 2 is a top plane view of the folded drop stitch panel of the transport box in plane view.

FIG. 2 shows a plan view of the transport box with the rear wall (4) as well as both side walls (2a) and (2b) and the flat-lying base (5). At the corners (7a) and (7b) the inner surface of the drop stitch panel (1) is bent inwards (8) at the folding marks (3a) and (3b), thereby creating the adhesive surfaces (9) and (10), a gap (11) remaining between the adhesive surfaces (9) and (10) and the outer wall of the drop stitch panel, so that an air channel comes about between the side walls, rear wall and the base, over which three sides and the base of the transport box can be inflated by way of a valve.

Figure 3:
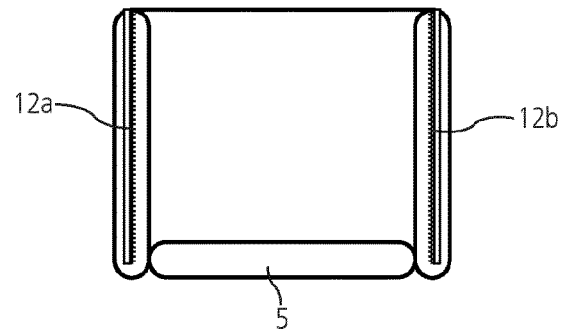
FIG. 3 is a front elevational view of the folded transport box in general view.

FIG. 3 shows the view of the transport box with zippers (12a) and (12b) on both sides.

Figure 4:
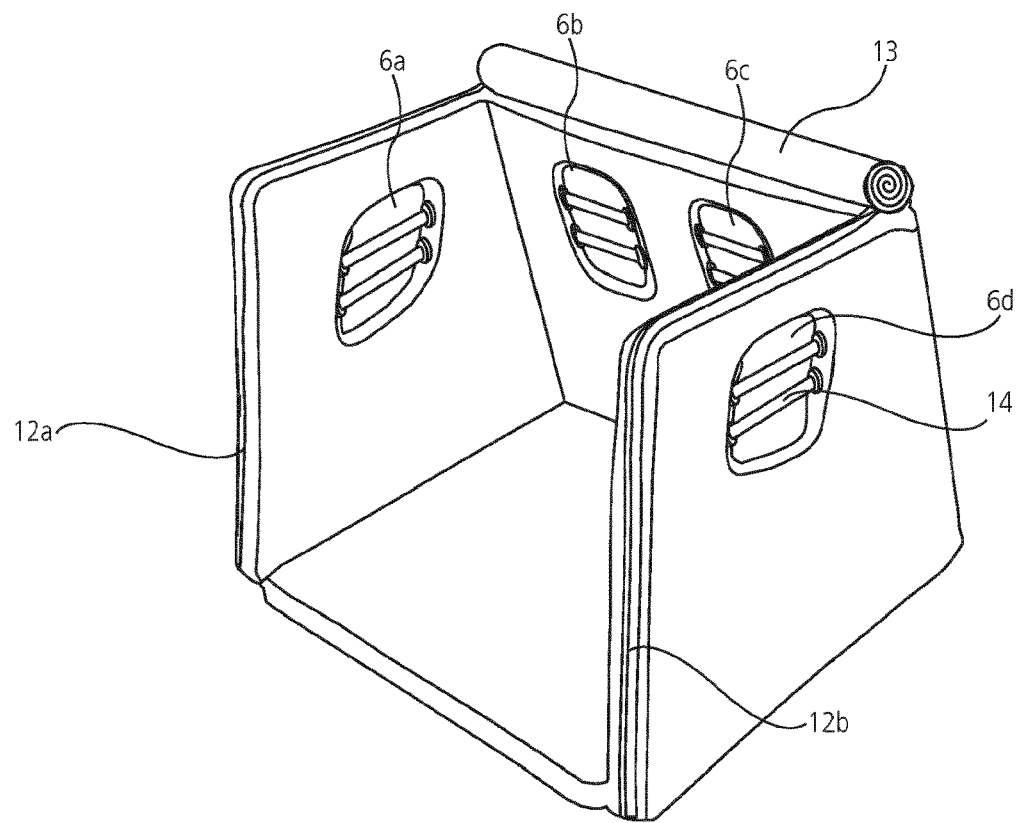
FIG. 4 is a perspective view of the transport box of the present technology.

FIG. 4 shows a perspective view of the transport box with its windows (6a), (b), (6c) and (6d) with the transverse rods (14) mounted therein, acting as a grid. To the two zippers (12a) and (12b) the roll-up front and top (13) of the transport box is attached.

Figure 5:
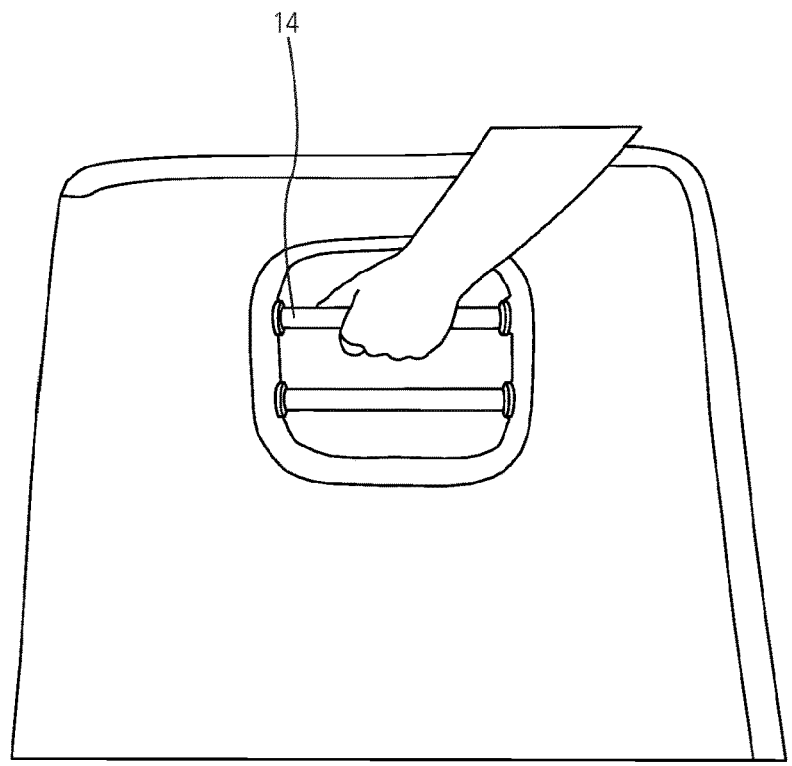
FIG. 5 is a side elevational view of the transport box being carried.

FIG. 5 shows the grid box being carried, the transverse rods (14) serving as handles.

Figure 6:
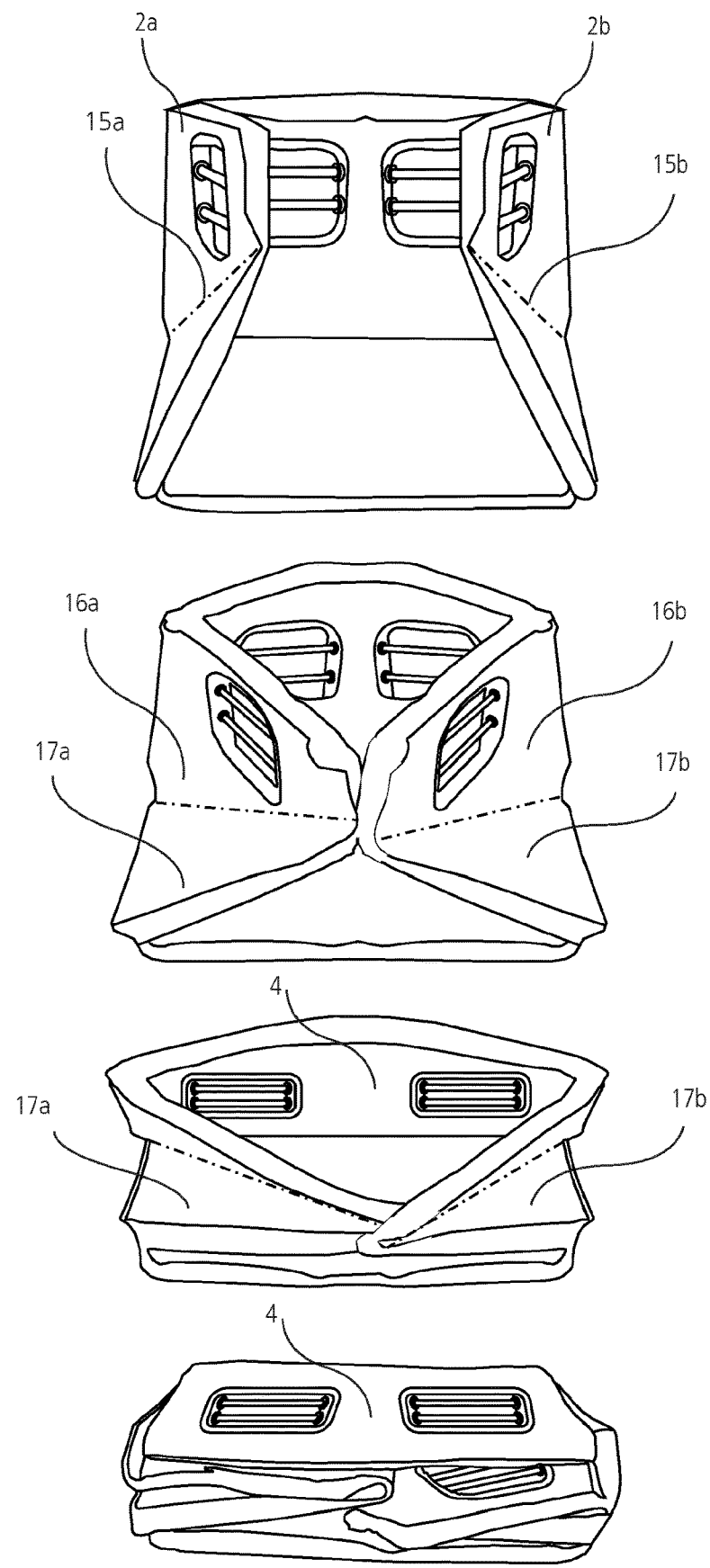
FIG. 6 is front perspective views of folding of the transport box after use.

FIG. 6 shows the folding of the transport box after the valve has been opened. During this process the side wall on the left (2a) slides underneath the side wall on the right (2b). The two side walls fold at predetermined folding lines (15a) and (15b), so that the upper surfaces (16a) and (16b) of the side wall come to rest on the lower surfaces (17a) and (17b) of the side wall. At the same time, the rear wall (4) folds forward as a whole and thus comes to rest on the folded side walls.

While embodiments of the inflatable transport box have been described in detail, it should be apparent that modifications and variations thereto are possible, all of which fall within the true spirit and scope of the present technology. With respect to the above description then, it is to be realized that the optimum dimensional relationships for the parts of the present technology, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present technology. For example, any suitable sturdy material may be used instead of the above-described. And although transporting dogs in a motorcar has been described, it should be appreciated that the inflatable transport box herein described is also suitable for providing a collapsible box adaptable to carry or store any item.

Therefore, the foregoing is considered as illustrative only of the principles of the present technology. Further, since numerous modifications and changes will readily occur to those skilled in the art, it is not desired to limit the present technology to the exact construction and operation shown and described, and accordingly, all suitable modifications and equivalents may be resorted to, falling within the scope of the present technology.

LIST OF REFERENCE NUMBERS

1 Drop stitch panel 2a side wall on the left
2b Side wall 3a on the right and
3b Fold markings
4 Rear wall
5 Base
6a, 6b, 6c, 6d Windows
7a and 7b Corners
8 Inwardly bent surface 9 and 10 adhesive surface
11 Gap
12a and 12b Zippers
13 Roll-up front and top
14 Transverse rods 15a and
15b Folding lines 16a and 16b upper surface 17a and lower surface 17b

The invention claimed is:

1. An inflatable transport box comprising:
a base;
a rear wall connected to said base along a folding edge and forming a single-piece drop stitch component with said base; and
first and second side walls connected to opposite sides of said rear wall along folding edges, respectively, said side walls are drop stitch components and each of said side walls defines a window;
wherein said base, said rear wall and said side walls being made of drop stitch material including an outer drop stitch wall and an inner drop stitch wall;
wherein partial surfaces of said inner drop stitch wall of said rear wall and said side walls, respectively, are arranged on both sides of a fold and are configured to come to rest on top of each other to form adhesive surfaces that are adhesively bonded together or welded to each other.

2. The inflatable transport box according to claim 1, wherein said adhesive surfaces are rectangular.

3. The inflatable transport box according to claim 2, wherein said folding edges are configured to define a gap through which air flows, said gap being at an angle next to said adhesive surfaces, respectively.

4. The inflatable transport box according to claim 1 further comprising at least one transverse rod arranged in said window of each of said side walls.

5. The inflatable transport box according to claim 1, wherein said rear wall defines a rear wall window including a transverse rod arranged in said rear wall window.

6. The inflatable transport box according to claim 1 further comprising a top wall configured to be rolled up, said top wall being mounted to an upper edge of said rear wall.

7. The inflatable transport box according to claim 6, wherein said top wall is connectable to an upper edge of said side walls by a zipper, respectively, configured to allow said top wall to be opened or closed.

8. The inflatable transport box according to claim 7, wherein said top wall is configured to be connectable to a front edge of said side walls by said zipper, respectively, said top wall has a length configured to cover between said upper edges of said side walls and between said front edges of said side walls when said top wall is in a closed position.

9. The inflatable transport box according to claim 1, wherein said each of said side walls are configured to collapse.

10. The inflatable transport box according to claim 1, wherein said side walls are respectively connected to said base along a folding edge and that said side walls are foldable along diagonal folding lines after air has been released.

11. The inflatable transport box according to claim 10, wherein said diagonal folding lines are configured to allow said side walls to fold inwardly toward said base, and said rear wall is configured to fold forward to rest on said folded side walls.

12. The inflatable transport box according to claim 11, wherein each of said folding lines extend from a corner defined by where said base, said rear wall and said side walls meet, to a front edge of said side walls, respectively.

13. The inflatable transport box according to claim 12, wherein each of said side walls defines a window located between an upper edge of said side walls and said folding lines, respectively.

14. The inflatable transport box according to claim 1, wherein said transport box is included with an article selected from the group consisting of an animal crate configured to accommodate one or more animals therein, a bicycle trailer configured to accommodate and transport of at least one child, and a pallet configured to receive a transport material.

15. An inflatable transport box comprising:
a base;
a rear wall connected to said base along a folding edge and forming a single-piece drop stitch component with said base; and
first and second side walls connected to opposite sides of said rear wall along folding edges, respectively, said side walls are drop stitch components;

wherein said base, said rear wall and said side walls being made of drop stitch material including an outer drop stitch wall and an inner drop stitch wall;

wherein partial surfaces of said inner drop stitch wall of said rear wall and said side walls, respectively, are arranged on both sides of a fold and are configured to come to rest on top of each other to form adhesive surfaces that are adhesively bonded together or welded to each other;

wherein said folding edges are configured to define a gap through which air flows, said gap being at an angle next to said adhesive surfaces, respectively.

16. The inflatable transport box according to claim 15, wherein said rear wall and said side walls each defines a window including at least one transverse rod arranged in said window.

17. The inflatable transport box according to claim 15, wherein said side walls are respectively connected to said base along a folding edge and that said side walls are foldable along diagonal folding lines after air has been released.

18. The inflatable transport box according to claim 15 further comprising a top wall configured to be rolled up, said top wall being mounted to an upper edge of said rear wall.

* * * * *